Aug. 19, 1958  J. A. PELLETIER  2,847,947
PROCESS FOR MAKING CANDY
Filed Dec. 17, 1956
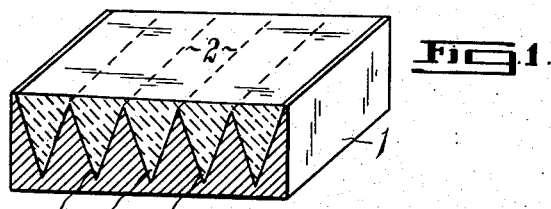
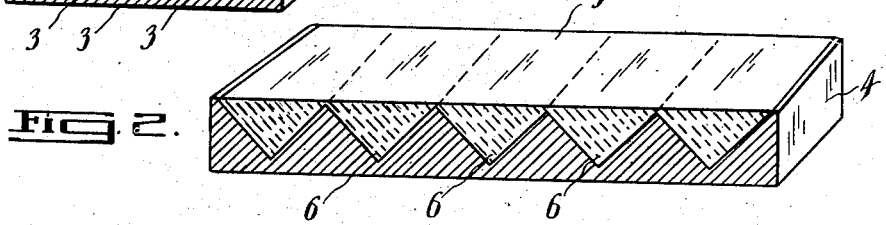
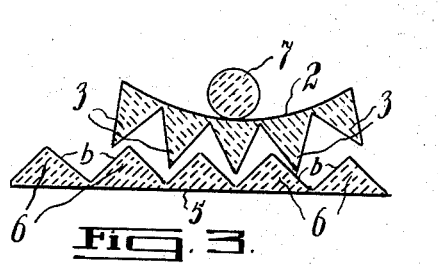
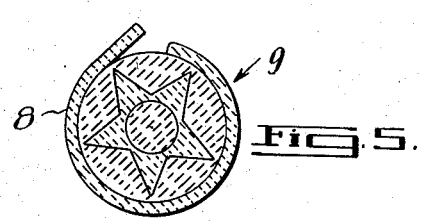
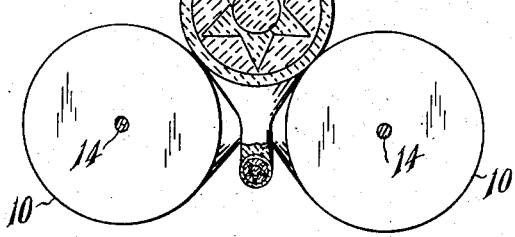
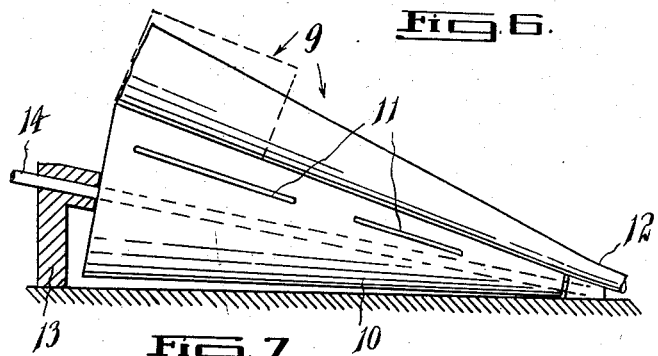
INVENTOR
J. A. PELLETIER
by Douglas S. Johnson
ATTY

United States Patent Office 2,847,947
Patented Aug. 19, 1958

2,847,947

PROCESS FOR MAKING CANDY

Joseph A. Pelletier, Montreal, Quebec, Canada, assignor to Allen-Crawford Limited, Montreal, Quebec, Canada Application December 17, 1956, Serial No. 628,749

6 Claims. (Cl. 107—54)

This invention relates to improvements in the manufacture of candy, and more particularly, to the production of candy incorporating special designs.

The principal object of the invention is to devise a simple and economical method of providing a central design in a piece of candy.

More particularly, it is the object of the invention to provide a method of incorporating a star in the center of a candy ring of contrasting colour.

Another important object is to provide a process as aforesaid which will enable the central disposition of the star design to be maintained through to the final wrapping of the candy.

According to the invention, the star design is formed by mating two saw tooth blocks of candy with the teeth of one being disposed to generally enter the grooves of the other, then rolling the interfitting blocks about a cylindrical candy block, and binding the rolled composite form within an encircling candy jacket. The candy block disposed on the inside of the rolled composite form may conveniently be nougat, although it may be toffee, hard spun or clear candy or the like, and the block disposed on the outside of the form may be a toffee of contrasting colour, although, again, it may be nougat, hard spun or clear candy or the like. The encircling jacket may also conveniently be toffee or other candy corresponding to the outer block.

Another feature of the invention resides in employing candy blocks of a size to produce a composite rolled form of substantially greater diameter than that of the desired finished candy and subsequently necking or elongating said composite form to reduce the diameter thereof to that desired.

These and other objects and features of the invention will be more fully understood with reference to the accompanying drawings, in which:

Figure 1 is a part transverse sectional, part perspective view illustrating one of the moulding steps involved in the manufacture of the candy according to the invention;

Figure 2 is a view similar to Figure 1 showing a second moulding step.

Figure 3 is a transverse vertical sectional view illustrating the manner in which the moulded candy blocks from Figures 1 and 2 are combined preparatory to rolling about a cylindrical candy block;

Figure 4 is a vertical sectional view showing the central star design formed on rolling the components of Figure 3 into a composite block;

Figure 5 is a view similar to Figure 4, but illustrating, as a subsequent step, the application of a binding ring;

Figure 6 is a more or less diagrammatic front elevational view of a pair of conical batch rollers on which the composite block of Figure 5 has been placed to effect an elongation thereof to reduce the block diameter while maintaining the central star design;

Figure 7 is a side elevational view of the batch rollers with their supports being illustrated in section, and showing their action to elongate the candy block.

In carrying out the production of the candy according to the invention, a quantity of suitable candy of appropriate colour and flavour is poured into a mould 1, Figure 1, of saw tooth form to produce a saw toothed block of candy 2, having teeth 3. As a separate step, candy cooled to a plastic consistency, and again of appropriate colour and flavour, is poured into a saw toothed mould 4 to produce a saw tooth candy block 5, having teeth 6.

The material which is moulded in the mould 1 may, for instance, be a chewy nougat, cooled to have a plastic consistency to conform to the mould, and when removed from the mould, to maintain its saw toothed shape. The material used to mould the block 4 may, for instance, be a toffee, the colour of which will be appropriately different from the colour of the block 2 to provide a distinctive contrast.

It will be noted that the teeth 3 of the block 2 are relatively narrow and deep, while the teeth 6 of the block 5 are relatively broad and somewhat shallower than the teeth 3. Thus the included angle $a$ between the teeth 3 of block 2 is somewhat smaller than the included angle $b$ between the teeth 6 of block 5, and because of the greater thickness of the teeth 6, approximately twice as much material is required to fill the mould 4 as is required to fill the mould 2.

When the saw toothed blocks 2 and 5 are removed from the moulds 1 and 4, and while they are still in a relatively soft state, they are brought together, as illustrated in Figure 3, with the block 2 inverted over the block 5 and the teeth 3 disposed generally between the teeth 6. It will be understood that because the teeth 3 and 6 are of different sharpness, they will not accurately interfit when the blocks 2 and 5 are brought face to face.

As illustrated in Figure 3, a cylindrical block 7 of candy, preferably of a colour contrasting to the colour of the block 2, and of appropriate flavour, is placed over the central tooth of the block 2. The block 5 is then rolled around the block 7 at the same time conforming the block 2 around the block 7. The result is that the star design of Figure 4 is formed with the block 5 forming the outer portion or frame of the design, the block 2 forming the star shape, and the block 5 forming a central contrast. The placing of the blocks 2 and 5 together and their rolling about the block 7 is effected quickly and while the material of the blocks 2 and 5 is still relatively soft and plastic.

The rolling operation forces the teeth 6 of the block 5 between the teeth 3 of the block 2 and the teeth 3 are forced apart to increase the angle $a$ formed therebetween while the teeth are in the block form to the angle $c$ formed therebetween when the block assumes the star shape of Figure 4, following rolling.

At the same time, the reverse effect takes place as the outer block 5 is rolled, and the angle $b$ between the teeth of the block 5 is decreased or closed on rolling to correspond to the thickness of the teeth 3 of block 2. As the blocks 2 and 5 are still in a relatively soft plastic state, the rolling can be quickly and easily accomplished and the intimate interfitting of the teeth 3 and 6 effected to produce a highly accurate star design.

Following the rolling operation to produce the composite block of Figure 4, a strip of material of a suitable colour and flavour, and indicated at 8 in Figure 5, is wrapped around the composite block to bind same in composite form. The resultant block produced in accordance with the steps set forth above may conveniently have substantial dimensions for ease of handling and for producing economically substantial quantities of candy. For instance, in the final form, as illustrated in Figure 5, the composite cylindrical block may have a diameter of the order of a foot or more, and may have a length, for instance, of one to one and a half feet.

This composite block, generally designated at 9, is placed on conical rolls 10 of a conical batch roller mechanism, it being understood that conical batch rollers are known in the art. These conical batch rollers, which may be of the order of, for instance, six feet in length, are arranged in side by side relation, and the block 9 is placed therebetween as shown in Figure 6. The rolls 10 are first driven in a clockwise direction, and then subsequently reversed and driven in an anti-clockwise direction. It has been found convenient to turn the rolls 10 in the one direction for approximately 15 seconds, and then to turn them in the reverse direction for the same period. This alternate rotation of the rolls is continued as long as required.

The rolls 10 are formed with ribs 11 thereon and as rotation occurs, the cylindrical block 9 is gradually reduced in diameter and elongated, as illustrated in solid line in Figure 7, until, emerging from the end of the batch rollers, it has a diameter according to that desired in the final candy product.

The cylindrical candy form coming off the rolls 10 may be conveniently cut or sliced perpendicular to the axis, and the cylindrical candy slices, thus produced, may be wrapped in any desired manner.

It has been found that under the action of the conical rollers, the elongation of the block 9 and the reduction of its diameter takes place symmetrically throughout the block so that the central star design is maintained centrally within the block and the proportions of the design are symmetrically reduced in accordance with the proportions of the whole block, so that the reduced candy form 12 coming off the rolls in Figure 7 is substantially identical with, and a miniature of, the shape and design of the block 9.

The rolls 10 may be supported by means of any suitable support 13, and may be driven through drive shafts 14, the detail of the drives and supporting means being omitted for sake of clarity.

It will be understood that the material used to form the blocks 2 and 5 can be selected at will, and for instance, the block 5 may be made of nougat and the block 2 made of toffee, or alternatively, other candy may be employed.

It will be understood that other various modifications in the details and steps of the invention may be made without departing from the spirit of the invention and scope of the appended claims. It will be appreciated that the star figure illustrated in the design formed according to the particular illustrations herein disclosed is a five-sided figure, but corresponding shapes with different numbers of points may likewise be produced in a similar manner.

What I claim as my invention is:

1. In the manufacture of candy, the steps of moulding a first saw toothed candy block and a different coloured second saw toothed candy block, and while said blocks are in a soft plastic state, arranging them in face to face relation with the teeth of the one block fitting generally between the teeth of the other block, then rolling said face to face blocks about a cylindrical candy block to form a composite cylindrical block.

2. In the manufacture of candy incorporating a central star figure design the steps of moulding a first saw toothed plastic candy block, moulding a second saw toothed plastic candy block of different colour, placing said blocks face to face with the teeth of one disposed generally between the teeth of the other, then rolling said blocks about a cylindrical candy block to form a generally cylindrical composite candy block incorporating a central star figure, then binding said cylindrical composite block with a candy strip.

3. In the manufacture of candy incorporating a central star figure arranged within a surrounding border, the steps of moulding a first saw toothed block of one colour candy cooled to a plastic state, the block being adapted to form the surrounding border, moulding a second saw toothed candy of a different coloured candy cooled to a plastic state, said second block being adapted to be formed into the star figure, the teeth of said first block being shallower and broader than the teeth of said second block and having a greater angle included therebetween, placing said first block with its teeth upright and inverting said second block over said first block with the teeth of the second block being disposed generally between the teeth of the first block, then, while said blocks are still in a plastic state, rolling said blocks about a cylindrical candy block with the first block outermost to close the teeth of the first block on the teeth of the second block and to spread the teeth of the second block to provide a composite cylindrical block having a central star design.

4. A process as claimed in claim 3 in which the composite cylindrical block is wrapped in an encircling candy strip.

5. A process as claimed in claim 3 in which said composite cylindrical block is rolled on batch rollers first in one direction and then in the opposite direction to elongate and reduce the diameter of said composite cylindrical block while maintaining said central star design, then slicing said elongated block at right angles to the axis thereof.

6. A process as claimed in claim 5 in which the batch rollers are operated to turn in the one direction for substantially the same length of time they are operated to turn in the reverse direction in the elongation of said composite cylindrical block.

References Cited in the file of this patent

UNITED STATES PATENTS

| | | |
|---|---|---|
| Re. 20,693 | Kisselle | Apr. 12, 1938 |
| 498,142 | Thoens | May 23, 1893 |
| 545,698 | Johnson | Sept. 3, 1895 |
| 1,318,310 | Becht et al. | Oct. 7, 1919 |
| 2,559,648 | Lindhe | July 10, 1951 |